(12) United States Patent
Suzuki et al.

(10) Patent No.: US 8,890,449 B2
(45) Date of Patent: Nov. 18, 2014

(54) ELECTRIC POWER TOOL, LOCK STATE OCCURRENCE DETERMINATION APPARATUS, AND PROGRAM

(75) Inventors: Jiro Suzuki, Anjo (JP); Takuya Kusakawa, Anjo (JP)

(73) Assignee: Makita Corporation, Anjo-Shi (JP)

( * ) Notice: Subject to any disclaimer, the term of this patent is extended or adjusted under 35 U.S.C. 154(b) by 209 days.

(21) Appl. No.: 13/703,420

(22) PCT Filed: May 26, 2011

(86) PCT No.: PCT/JP2011/062114
§ 371 (c)(1),
(2), (4) Date: Dec. 11, 2012

(87) PCT Pub. No.: WO2011/158629
PCT Pub. Date: Dec. 22, 2011

(65) Prior Publication Data
US 2013/0082631 A1    Apr. 4, 2013

(30) Foreign Application Priority Data
Jun. 17, 2010  (JP) ................. 2010-138450

(51) Int. Cl.
| | |
|---|---|
| H02P 6/00 | (2006.01) |
| H02P 29/02 | (2006.01) |
| B25F 5/00 | (2006.01) |
| H02P 6/12 | (2006.01) |
| B25B 21/02 | (2006.01) |
| H02H 7/093 | (2006.01) |

(52) U.S. Cl.
CPC .............. *H02H 7/093* (2013.01); *H02P 29/021* (2013.01); *B25F 5/00* (2013.01); *H02P 6/12* (2013.01); *B25B 21/02* (2013.01)
USPC ...... 318/400.01; 318/603; 318/721; 318/779; 318/799; 318/268; 81/464; 81/469; 173/4; 173/15; 173/47; 173/176; 320/114

(58) Field of Classification Search
CPC ........ H02H 7/093; B60W 10/08; G05B 19/40
USPC ................ 318/114, 115, 119, 139, 266, 268, 318/400.01, 400.14, 400.15, 400.22, 430, 318/432, 434, 466, 599, 603, 609, 652, 685, 318/696, 721, 811; 81/464, 469, 57.11; 173/4, 15, 47, 48, 93.5, 176, 217; 324/510, 511; 83/331; 320/114
See application file for complete search history.

(56) References Cited

U.S. PATENT DOCUMENTS

| | | | |
|---|---|---|---|
| 7,521,892 B2 * | 4/2009 | Funabashi et al. ............ 320/114 |
| 2009/0295313 A1 | 12/2009 | Suzuki et al. | |
| 2010/0307782 A1 | 12/2010 | Iwata et al. | |
| 2010/0308764 A1 | 12/2010 | Suzuki et al. | |

FOREIGN PATENT DOCUMENTS

| | | |
|---|---|---|
| JP | A-2002-238282 | 8/2002 |
| JP | A-2006-218605 | 8/2006 |
| JP | A-2009-190118 | 8/2009 |
| JP | A-2009-285805 | 12/2009 |
| WO | WO 2009/087834 A1 | 7/2009 |

OTHER PUBLICATIONS

International Search Report issued in International Application No. PCT/JP2011/062114 dated Aug. 2, 2011 (w/translation).

* cited by examiner

*Primary Examiner* — Antony M Paul
(74) *Attorney, Agent, or Firm* — Oliff PLC

(57) ABSTRACT

A lock state occurrence determination apparatus includes a counter, a reset device, a reference time changing device, a lock state determination device, and an invalidation device. The invalidation device performs, in a case where a false determination of occurrence of a lock state of a motor is caused by the lock state determination device due to an operation input to operate a rotation speed of the motor, at least one of a first invalidation operation to invalidate the lock state determination device and a second invalidation operation to invalidate continuation of a counting operation by the counter.

13 Claims, 12 Drawing Sheets

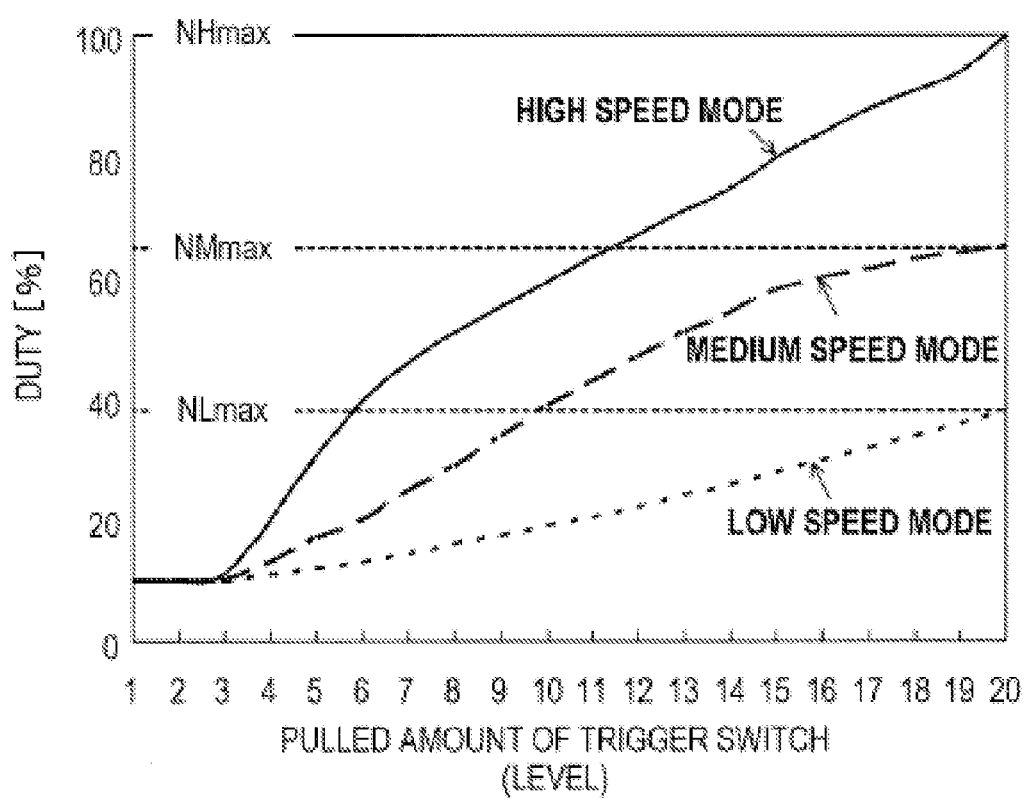

FIG.4A

| LEVEL | DUTY [%] | LOCK DETERMINATION TIME Tr [s] |
|---|---|---|
| 1 - 4 | 10 | 10 |
| 5 | 12 | 9 |
| 6 | 13 | 8 |
| 7 | 14 | |
| 8 | 16 | |
| 9 | 18 | |
| 10 | 20 | 7 |
| 11 | 21 | |
| 12 | 22 | 6 |
| 13 | 24 | |
| 14 | 26 | |
| 15 | 28 | 5 |
| 16 | 30 | 4 |
| 17 | 32 | 3 |
| 18 | 34 | 2 |
| 19 | 36 | |
| 20 | 38 | 1 |

FIG.4B

| LEVEL | DUTY [%] | LOCK DETERMINATION TIME Tr [s] |
|---|---|---|
| 1 - 3 | 10 | 10 |
| 4 | 14 | |
| 5 | 16 | 8 |
| 6 | 18 | |
| 7 | 20 | |
| 8 | 28 | 5 |
| 9 | 36 | |
| 10 | 38 | 1 |
| 11 | 45 | 0.8 |
| 12 | 50 | 0.6 |
| 13 | 52 | 0.5 |
| 14 | 55 | 0.4 |
| 15 | 58 | 0.3 |
| 16 | 60 | 0.2 |
| 17 | 61 | |
| 18 | 63 | |
| 19 | 64 | |
| 20 | 65 | |

FIG.4C

| LEVEL | DUTY [%] | LOCK DETERMINATION TIME Tr [s] |
|---|---|---|
| 1 - 3 | 10 | 10 |
| 4 | 26 | 5 |
| 5 | 30 | 1 |
| 6 | 43 | 0.8 |
| 7 | 45 | |
| 8 | 52 | 0.5 |
| 9 | 53 | |
| 10 | 58 | 0.3 |
| 11 | 60 | 0.2 |
| 12 | 66 | |
| 13 | 68 | |
| 14 | 70 | |
| 15 | 80 | 0.1 |
| 16 | 84 | |
| 17 | 88 | 0.08 |
| 18 | 91 | |
| 19 | 94 | |
| 20 | 100 | 0.07 |

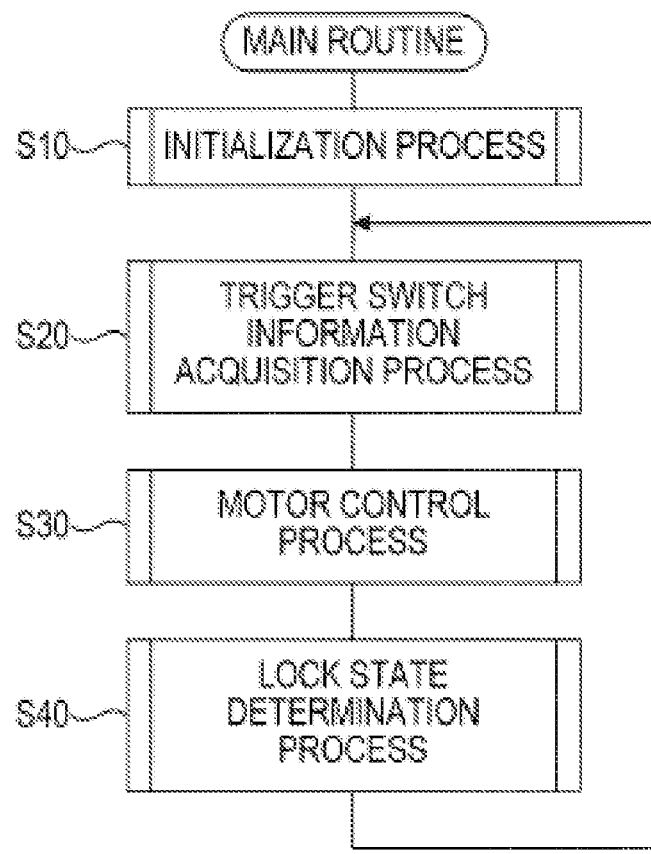

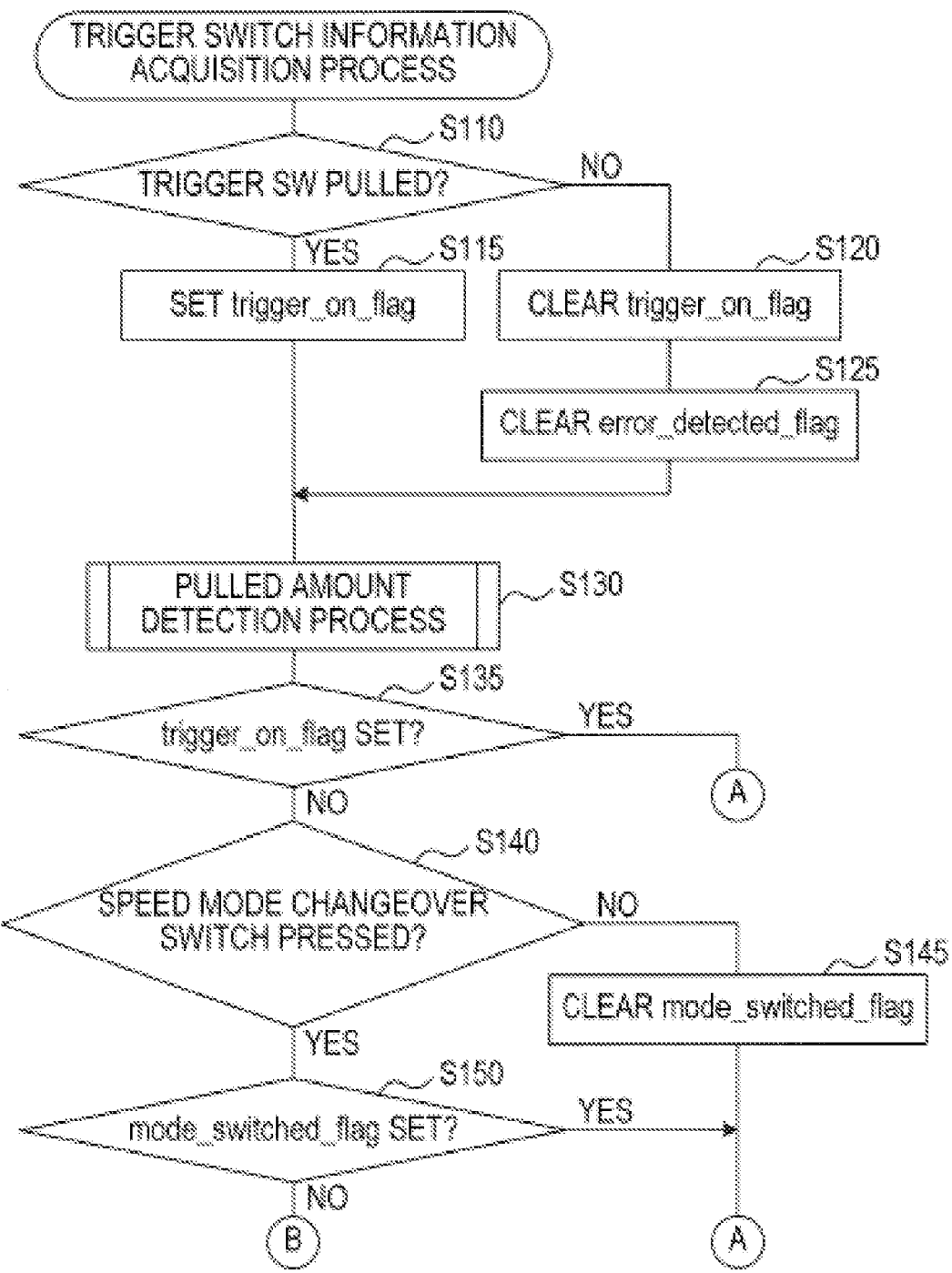

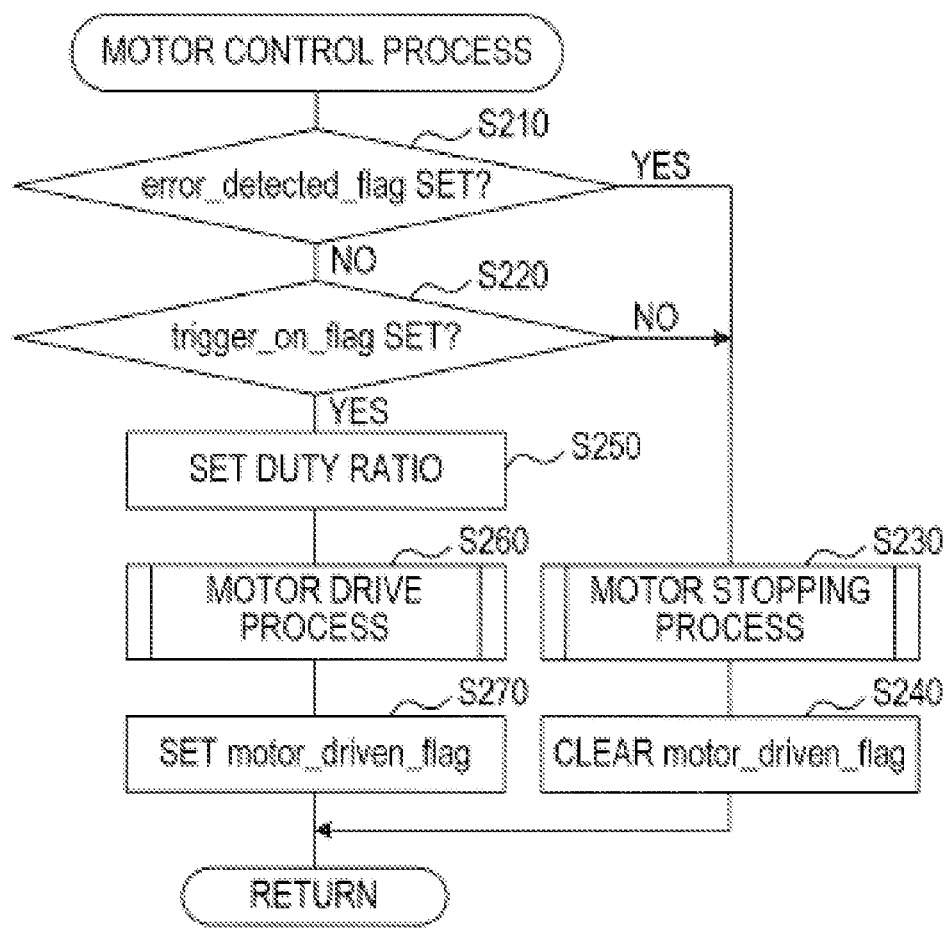

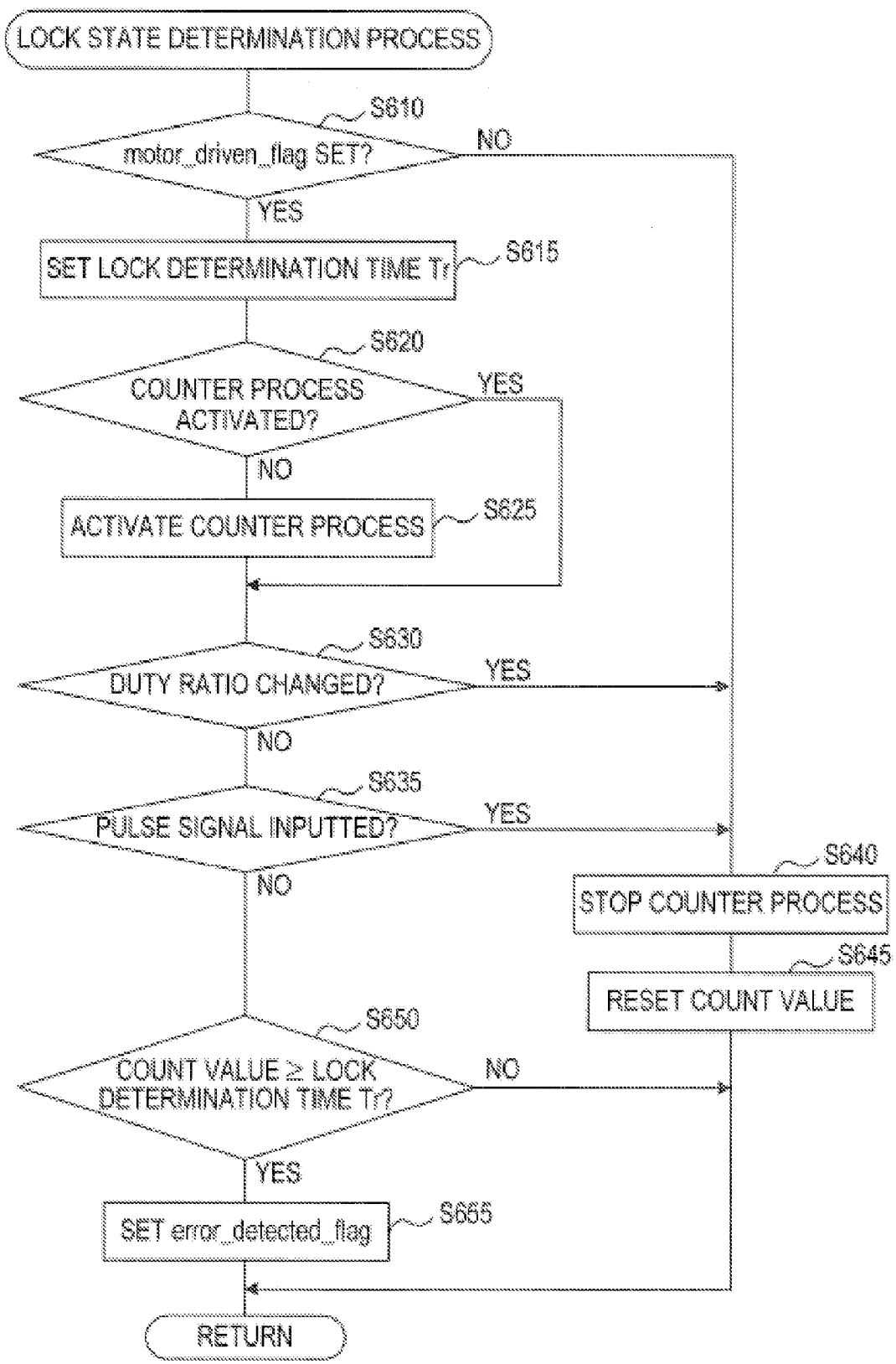

ELECTRIC POWER TOOL, LOCK STATE OCCURRENCE DETERMINATION APPARATUS, AND PROGRAM

CROSS-REFERENCE TO RELATED APPLICATIONS

This international application claims the benefit of Japanese Patent Application No. 2010-138450 filed Jun. 17, 2010 in the Japan Patent Office, and the entire disclosure of Japanese Patent Application No. 2010-138450 is incorporated herein by reference.

TECHNICAL FIELD

The present invention relates to a technique to determine whether or not a motor which is to rotationally drive a tool element of an electric power tool has been locked.

BACKGROUND ART

In an electric power tool disclosed in Patent Document 1 below, a plurality of lock determination times to determine whether or not a motor has been locked and respective operation amounts of a trigger switch corresponding to the plurality of lock determination times are stored. More specifically, in a same speed mode, a larger operation amount is associated with a shorter lock determination time, while a smaller operation amount is associated with a longer lock determination time.

In the electric power tool, a control process described below is executed.

Specifically, an initial process is performed, and then it is determined whether or not the electric power tool is in an abnormal state. When it is determined that the electric power tool in a normal state, it is then determined whether or not the trigger switch is ON. When it is determined that the trigger switch is ON, a lock determination time corresponding to the operation amount of the trigger switch is selected, the motor is driven at a duty ratio corresponding to the operation amount of the trigger switch, and a counter for measuring an elapsed time required for the motor to rotate by a predetermined amount is incremented. If the motor has been rotated by the predetermined amount before a value of the counter reaches the selected lock determination time, the value of the counter is reset to zero, and a determination step regarding a battery voltage is performed, and then the aforementioned determination step regarding the abnormal state and subsequent steps are performed again. On the other hand, if the motor has been locked and the value of the counter reaches the selected lock determination time, it is determined that the motor has been locked, and the aforementioned determination step regarding the abnormal state is performed again, and it is determined that the electric power tool is in the abnormal state.

PRIOR ART DOCUMENTS

Patent Documents

Patent Document 1: Japanese Patent Application Publication No. 2009-285805

SUMMARY OF THE INVENTION

Problems to be Solved by the Invention

In the aforementioned control process, when the counter is incremented and then determination step regarding the abnormal state and the subsequent steps are performed again, a new lock determination time is selected again depending on the operation amount of the trigger switch.

Accordingly, in a case where the operation amount of the trigger switch become substantially large from when a longer lock determination time for a smaller operation amount of the trigger switch is selected until when a new lock determination time is selected, and if a shorter lock determination time is newly selected, the value of the counter may immediately reach the lock determination time. As a result, a false determination may be made that the motor has been locked despite the fact that the motor has not been locked.

Therefore, the present invention has an object to provide a technique that may suppress false determination on occurrence of the lock state of the motor due to an operation input inputted by an operator of the electric power tool in order to operate a rotation speed of the motor, which rotationally drives the tool element of the electric power tool.

Means for Solving the Problems

An electric power tool in a first aspect of the present invention, which has been made to achieve the aforementioned object, includes a motor, an operation input receiving device, a rotation speed control device, a counter, a reset device, a reference time changing device, a lock state determination device, and an invalidation device.

The motor rotationally drives a tool element, the operation input receiving device receives an operation input to operate a rotation speed of the motor from an operation of the electric power tool. The rotation speed control device controls the rotation speed of the motor in accordance with the operation input inputted through the operation input receiving device. The counter performs a counting operation to count, as a count value, an elapsed time required for the motor to rotate by a predetermined amount. The reset device resets the count value of the counter to an initial value when the motor rotates by the predetermined amount. The reference time changing device changes a reference time, which is used as a determination criterion to determine whether or not a lock state of the motor has occurred, in accordance with the operation input inputted through the operation input receiving device. The lock state determination device determines that the lock state has occurred when the count value of the counter has reached the reference time. The invalidation device performs, in a case where a false determination of occurrence of the lock state is caused due to the operation input inputted through the operation input receiving device, at least one of a first invalidation operation to invalidate the lock state determination device and a second invalidation operation to invalidate continuation of the counting operation by the counter.

According to the electric power tool configured as above, in a case where a false determination of occurrence of the lock state is caused due to the operation input, the lock state determination device is invalidated, or continuation of the counting operation by the counter is invalidated, and thereby the count value of the counter is avoided from reaching the reference time. Thus, it is possible to suppress occurrence of a false determination.

The tool element may be detachably attached to the electric power tool, or may be undetachably attached to the electric power tool.

The invalidation device may invalidate continuation of the counting operation by the counter in any manner in the second invalidation operation. For example, it may be possible to invalidate continuation of the counting operation by performing a stopping operation to stop the counting operation by the counter.

When the counting operation is stopped, the count value of the counter no longer increases, and it is therefore possible to securely suppress the count value from reaching the reference time.

Alternatively, the invalidation device may invalidate continuation of the counting operation by the counter, for example, by performing a reset operation to reset the count value of the counter to an initial value.

When the count value of the counter is reset to the initial value, the count value counted by the time the count value is reset to the initial value is invalidated, and it is therefore possible to securely suppress the count value of the counter from reaching the reference time.

Also, the invalidation device may perform, in any case where a false determination of occurrence of the lock state is caused due to the operation input inputted through the operation input receiving device, at least one of the first invalidation operation and the second invalidation operation.

The invalidation device may perform, for example, in case where the operation input inputted through the operation input receiving device is an operation input within a predetermined specific range, at least one of the first invalidation operation and the second invalidation operation.

That is, by setting a range of the operation input by which a false determination of occurrence of the lock state is caused is set to the predetermined specified range, the invalidation device can invalidate the lock state determination device or invalidate continuation of the counting operation by the counter in the case where a false determination of occurrence of the lock state is caused due to the operation input.

Alternatively, the invalidation device may perform, for example, in a case where the operation input inputted through the operation input receiving device has changed by a predetermined specified amount, at least one of the first invalidation operation and the second invalidation operation.

That is, by setting an amount of change of the operation input by which a false determination of occurrence of the lock state is caused to the predetermined specified amount, the invalidation device can invalidate the lock state determination device or invalidate continuation of the counting operation by the counter in the case where a false determination of occurrence of the lock state is caused due to the operation input.

Further, the reference time changing device may change the reference time in any manner in accordance with the operation input inputted through the operation input receiving device. For example, the reference time changing device may continuously change the reference time.

In this case, it is possible to continuously set an appropriate reference time with respect to the operation input.

Alternatively, the reference time changing device may, for example, stepwisely change the reference time in accordance with the operation input inputted through the operation input receiving device.

In this case, it is possible to set an appropriate reference time in a stepwise manner with respect to the operation input.

Moreover, the reference time changing device may change the reference time such that the reference time becomes shorter as the rotation speed of the motor, which is in accordance with the operation input inputted through the operation input receiving device, is higher.

By changing the reference time in this manner, occurrence of the lock state can be more appropriately determined since the elapsed time required for the motor to rotate by a predetermined amount becomes shorter as the rotation speed of the motor is higher.

The counter, which may be configured in any manner to count the elapsed time as the count value, may include, for example, a first sub-counter and a second sub-counter.

The first sub-counter increments a previously set timer value based on an electrical signal which periodically changes, and the second sub-counter repeatedly increments a count value of a counter which is set in a previously secured storage area each time the timer value incremented by the first sub-counter has reached a previously set threshold value.

In this case, for example, by setting to a threshold value a value which is smaller than a value corresponding to the reference time, and which the timer value cannot reach when the lock state has not occurred, it is possible to suppress the count value of the counter from being incremented uselessly by the second sub-counter despite the fact that the lock state obviously has not occurred.

Further, the aforementioned electric power tool may include a motor stopping device that stops the motor when the lock state determination device determines that the lock state has occurred.

In this case, by stopping the motor when the lock state has occurred, it is possible to suppress damage of the motor resulting from the lock state.

Moreover, the rotation speed control device may control the rotation speed of the motor in any manner in accordance with the operation input inputted through the operation input receiving device. For example, the rotation speed control device may control the rotation speed of the motor by performing PWM control of a voltage to be applied to the motor in order to rotationally drive the motor.

In this case, it is possible to control the rotation speed of the motor without causing a significant loss of electric power to be supplied to the motor.

The operation input receiving device may be configured in any manner to receive an operation input from an operator of the electric power tool. For example, the operation input receiving device may include a first switch that receives one of a speed increasing operation, a constant speed operation, and a speed decreasing operation of the rotation speed of the motor as the operation input, and a second switch that receives a setting operation to set one of a rate of change of the rotation speed of the motor and a maximum value of the rotation speed of the motor as the operation input.

In this case, the rotation speed control device may control the rotation speed of the motor in accordance with the operation input inputted through the first switch and the operation input inputted through the second switch.

According to the electric power tool configured as described above, the operator of the electric power tool can perform the speed increasing operation, the constant speed operation, and the speed decreasing operation of the rotation speed of the motor, and can also set at least one of the rate of change of the rotation speed of the motor and the maximum value of the rotation speed of the motor, and thus can operate the electric power tool in a more preferable manner.

The first switch may be configured in any manner to receive one of the speed increasing operation, the constant speed operation, and the speed decreasing operation as the operation input. For example, the first switch may be configured to be movable among a plurality of positions so as to receive a position of the first switch as the operation input.

In this case, the operator of the electric power tool can perform the speed increasing operation, the constant speed operation, and the speed decreasing operation of the rotation speed of the motor by changing the position of the first switch.

Next, a lock state occurrence determination apparatus in a second aspect of the present invention includes a counter, a reset device, a reference time changing device, a lock state determination device, and an invalidation device.

The counter performs a counting operation to count, as a count value, an elapsed time required for a motor, which is to rotationally drive a tool element of an electric power tool, to rotate by a determination amount. The reset device resets the count value of the counter to an initial value when the motor rotates by the predetermined amount. The reference time changing device changes a reference time, which is used as a determination criterion to determine whether or not a lock state of the motor has occurred, in accordance with an operation input inputted to operate a rotation speed of the motor by an operator of the electric power tool. The lock state determination device determines that the lock state has occurred when the count value of the counter has reached the reference time. The invalidation device performs, in a case where a false determination of occurrence of the lock state is caused due to the operation input, at least one of a first invalidation operation to invalidate the lock state determination device and a second invalidation operation to invalidate continuation of the counting operation by the counter.

According to the lock state occurrence determination apparatus configured as above, in the case where the false determination of occurrence of the lock state is caused due to the operation input, occurrence of the false determination can be suppressed by the lock state determination device being invalidated, or by continuation of the counting operation by the counter being invalidated, and thus by the count value of the counter being avoided from reaching the reference time.

Next, a program in a third aspect of the the present invention is a program for causing a computer to function as the counter, the reset device, the reference time changing device, the lock state determination device, and the invalidation device in the lock state occurrence determination apparatus in the second aspect.

According to the program, it is possible to cause the computer to function as the lock state determination apparatus in the second aspect.

In this case, the aforementioned computer may be a well-known computer or may be a computer which is configured preferably for an electric power tool.

Also, the aforementioned program may be used by being stored in a ROM or a backup RAM installed in a computer and loaded from the ROM or the backup RAM to the computer, or may be used by being loaded to the computer through a network.

Further, the aforementioned program may be used by being stored in a computer-readable recording medium in any form. Such recording medium includes, for example, a portable semiconductor memory (such as a USB memory or a Memory Card (registered trademark)).

BRIEF DESCRIPTION OF THE DRAWINGS

FIG. 3 is an explanatory diagram showing an overview of changes in DUTY (duty ratio) with respect to a pulled amount (LEVEL) of a trigger switch.

FIGS. 4A-4C are explanatory view showing tables in each of which respective values of DUTY (duty ratio) and lock determination time corresponding to the pulled amount (LEVEL) of the trigger switch are set, FIG. 4A showing a table for a low speed mode, FIG. 4B showing a table for a medium speed mode, and FIG. 4C showing a table for a high speed mode.

FIG. 5 is a flowchart showing a flow of a main routine executed by a CPU of the electric power tool.

FIG. 6A is a flowchart showing a flow of a part of a trigger switch information acquisition process in the main routine.

FIG. 7 is a flowchart showing a flow of a motor control process in the main routine.

FIG. 11 is a flowchart showing a flow of a lock state determination process in the third embodiment.

EXPLANATION OF REFERENCE NUMERALS

1 . . . electric power tool, 2, 3 . . . halved housing, 4 . . . handle portion, 5 . . . main body housing, 6 . . . battery pack, 7 . . . motor housing, 8 . . . chuck sleeve, 9 . . . speed mode changeover switch, 10 . . . trigger switch, 11 . . . drive device, 12 . . . motor drive circuit, 13 . . . control circuit, 14 . . . rotational position sensor, 15 . . . regulator, 16 . . . drive start switch, 17 . . . variable resistor 18 . . . battery, 19 . . . clock signal generator, 20 . . . motor, 21, 22, 23, 24, 25, 26 . . . gate circuit, 131 . . . CPU, 132 . . . memory, 133 . . . I/O port, 134 . . . A/D converter, 135 . . . timer

MODE FOR CARRYING OUT THE INVENTION

Embodiments of the present invention will be described hereinafter with reference to the drawings.

First Embodiment

Figure 1:
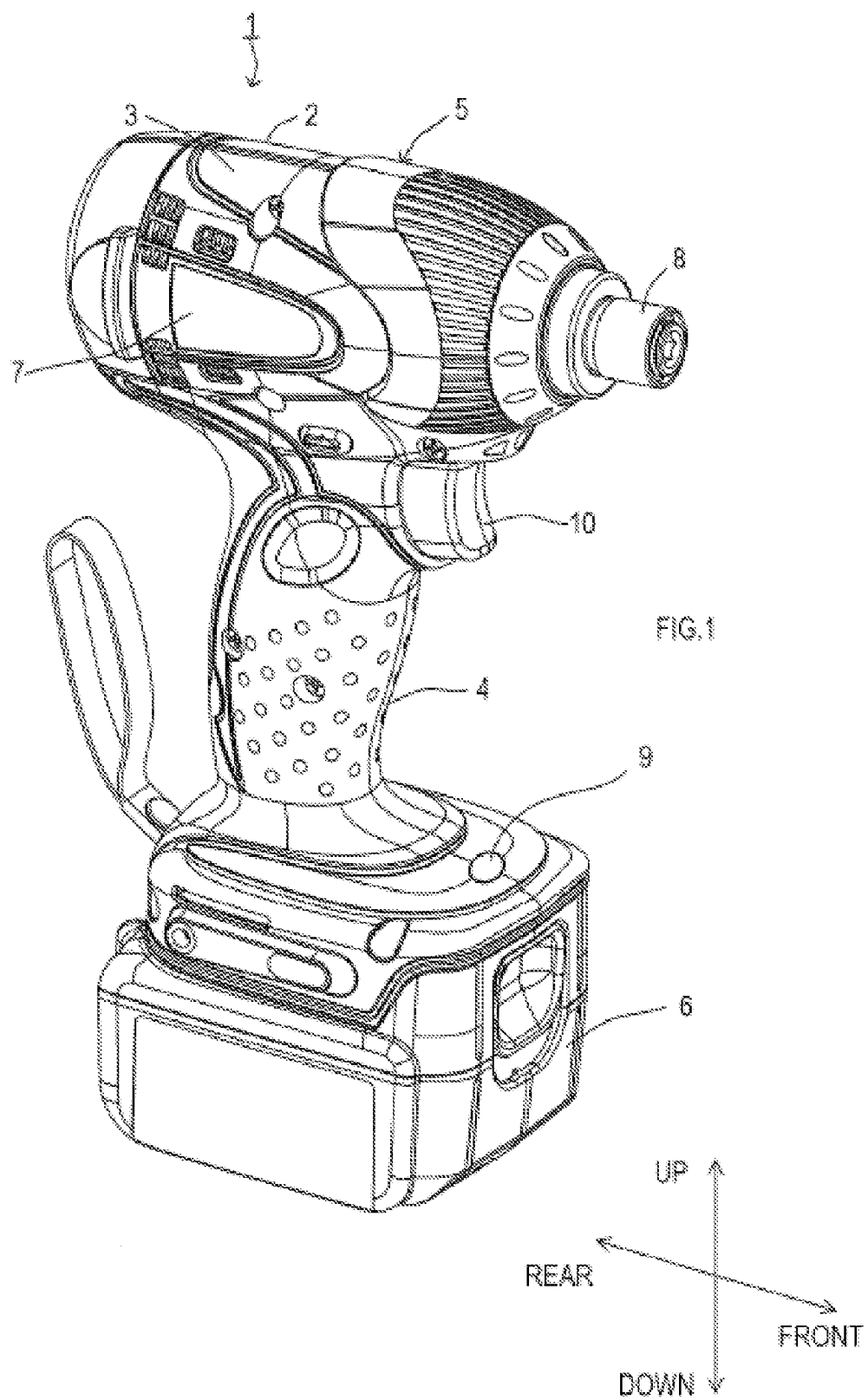
FIG. 1 is a perspective view showing an appearance of an electric power tool in a first embodiment.

As shown in FIG. 1, an electric power tool 1 according to a first embodiment is constituted as a so-called impact driver.

More specifically, the electric power tool 1 includes a main body housing 5 and a battery pack 6. The main body housing 5 is formed by assembling halved housings 2 and 3, and a handle portion 4 is extendingly provided below the main body housing 5. The battery pack 6 is detachably attached to a lower end of the handle portion 4.

A motor housing 7 for housing a motor 20 (see FIG. 2) as a power source of the electric power tool 1 is provided in a rear portion of the main body housing 5. Not-shown deceleration mechanism and impact mechanism are housed forwardly of the motor housing 7.

At a front end of the main body housing 5, there is projectingly provided a chuck sleeve 8 which enables detachable attachment of a not-shown tool bit (for example, a driver bit) as an example of a tool element to a front end of the impact mechanism.

The impact mechanism includes, for example, a spindle, a hammer, and an anvil. The spindle is rotated through the deceleration mechanism, and the hammer is rotated together with the spindle and is axially movable. The anvil is disposed forwardly of the hammer, and a tool bit is to be attached to a front end of the anvil.

More specifically, the impact mechanism is configured as described below.

In the impact mechanism, when the spindle is rotated following a rotation of the motor 20, the anvil is rotated through the hammer, to thereby rotate the tool bit. Afterward, when screw tightening by the tool bit proceeds and a load on the anvil is increased, the hammer retracts against a biasing force of a coil spring, and is separated from the anvil. When the hammer is moved forward by the biasing force of the coil spring while being rotated together with the spindle, and is engaged with the anvil again, intermittent impacts are applied to the anvil and thereby an additional tightening is performed. Since such impact mechanism is disclosed, for example, in Unexamined Patent application Publication No. 2006-218605, a detailed explanation of the impact mechanism is omitted here.

A trigger switch 10, which the operator of the electric power tool 1 can operate while gripping the handle portion 4, is provided to the main body housing 5 above the handle portion 4. At a lower end of the handle portion 4, there is provided a push-button speed mode changeover switch 9 for setting a speed mode of a rotation speed of the motor 20 (and thus a speed mode of a rotation speed of the tool bit).

The electric power tool 1 of the first embodiment is configured such that the aforementioned speed mode can be changed over to one of a high speed mode, a medium speed mode, and a low speed mode by the operator operating the speed mode changeover switch 9 (initially set to the high speed mode). A highest rotation speed of the motor 20 (a maximum duty ratio) varies depending on each speed mode, and a highest rotation speed (a maximum duty ratio) in the high speed mode is highest, and a highest rotation speed in the low speed mode is lowest. That is, when the operator operates the trigger switch 10, the motor 20 is rotated at a set rotation speed in accordance with an operation amount (a pulled amount) of the trigger switch 10 with the highest rotation speed corresponding to the speed mode set by the speed mode changeover switch 9 as an upper limit.

Figure 2:
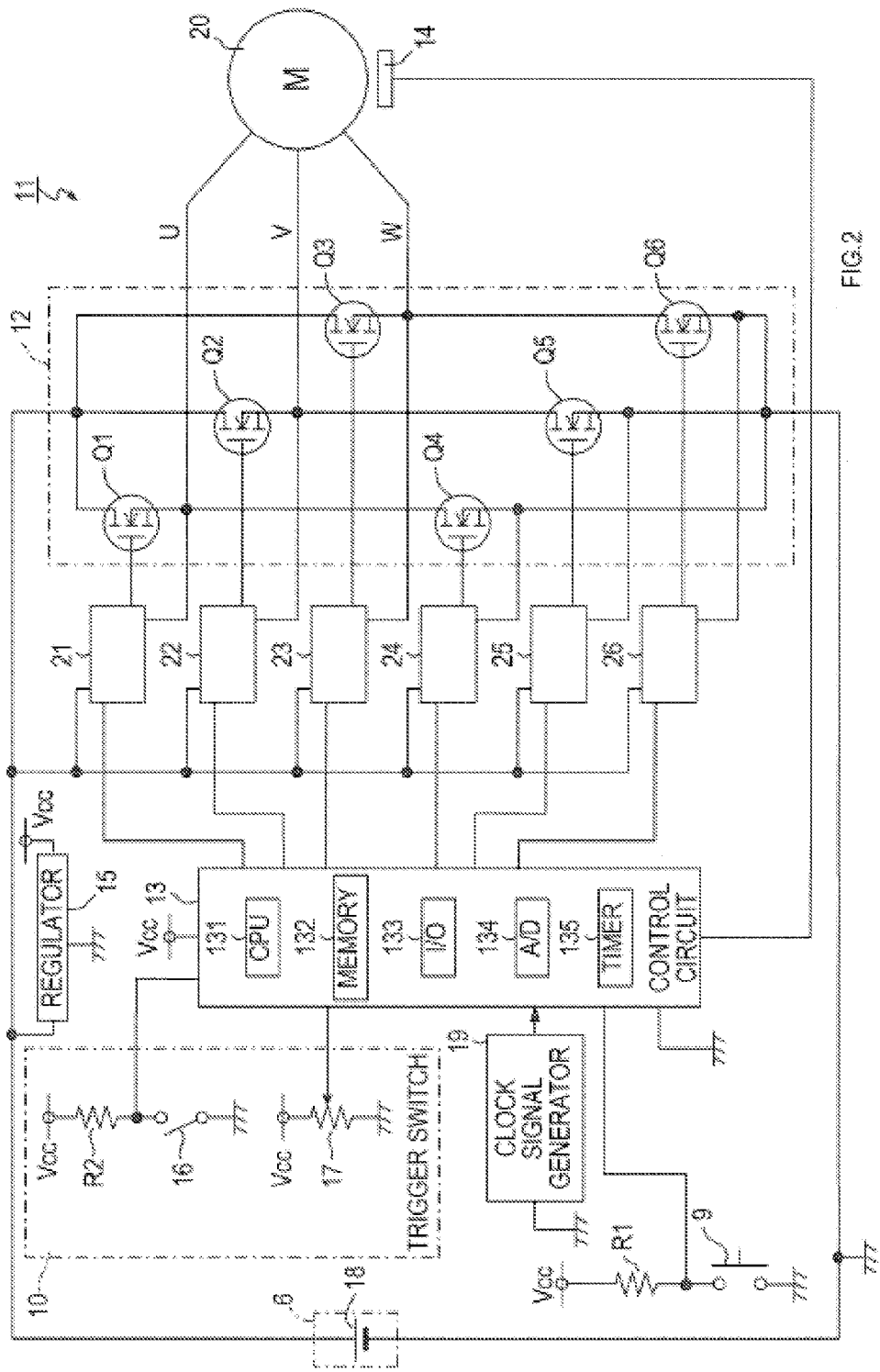
FIG. 2 is an electric circuit diagram showing a configuration of a drive device of a motor installed in the electric power tool.

As shown in FIG. 2, the battery pack 6 houses a battery 18, and the batter 18 is constituted by a not-shown plurality of secondary battery cells, each generating a predetermined direct voltage, which are serially connected. A drive device 11 provided in the handle portion 4 is configured to operate by receiving power supply from the battery 18 to thereby rotate the motor 20 in accordance with operation inputs to be inputted through the speed mode changeover switch 9 and the trigger switch 10.

More specifically, the drive device 11 includes a motor drive circuit 12, gate circuits 21 to 26, a control circuit 13, a regulator 15, and a clock signal generator 19.

The motor 20 of the first embodiment is constituted as a three-phase brushless direct current motor, and terminals U, V, and W of the motor 20 are connected to the battery pack 6 (more specifically, the battery 18) through the motor drive circuit 12. Each of the terminals U, V, and W is connected to one of not-shown three coils provided in the motor 20 in order to rotate a not-shown rotor of the motor 20.

The motor drive circuit 12 is constituted as a bridge circuit which includes three switching devices Q1 to Q3 as so-called high side switches, which connect the terminals U, V, and W of the motor 20 to a positive electrode of the battery 18, and three switching devices Q4 to Q6 as so-called low side switches which connect the terminals U, V, and W of the motor 20 to a negative electrode of the battery 18. The switching devices Q1 to Q6 in the first embodiment are well-known MOSFETs.

Each of the gate circuits 21 to 26 is connected to the control circuit 13 and is also connected to a gate and a source of one of the switching devices Q1 to Q6. The respective gate circuits 21 to 26 apply switching voltages to turn on/off the respective switching devices Q1 to Q6 between respective gates and sources of the respective switching devices Q1 to Q6, thereby to turn on/off the respective switching devices Q1 to Q6 based on control signals inputted to the respective gate circuits 21 to 26 from the control circuit 13 in order to control on/off of the respective switching devices Q1 to Q6.

The regulator 15 reduces a direct current voltage (for example, 14.4 VDC) generated by the battery 18 to generate a control voltage Vcc (for example, 5 VDC), which is a predetermined direct current voltage, and applies the generated control voltage Vcc to predetermined circuits in a drive device 11, including the control circuit 13.

The clock signal generator 19 is configured to generate a well-known clock signal, while the predetermined direct current voltage is applied from the control circuit 13 through a not-shown path. Although the clock signal generator 19 of the first embodiment is provided outside the control circuit 13, the clock signal generator 19 may be provided inside the control circuit 13.

The control circuit 13, which is configured as a so-called one chip microcomputer, includes at least a CPU 131, a memory 132, an input/output (I/O) port 133, an analog/digital (A/D) converter 134, and a timer 135. The memory 132 includes a ROM, a RAM, and a rewritable non-volatile memory device (such as a flash ROM or an EEPROM). The CPU 131 operates in synchronization with the aforementioned clock signal, and executes various processes in accordance with various programs stored in the memory 132. The timer 135 is a well-known timer that measures time based on the aforementioned clock signal or a pulse-train signal generated by frequency-dividing the aforementioned clock signal. More specifically, the timer 135 increments a timer value indicating a measured time in accordance with the aforementioned clock signal or the pulse-train signal generated by frequency-dividing the aforementioned clock signal.

The speed mode changeover switch 9, the trigger switch 10, and a rotational position sensor 14 provided to the motor 20 are connected to the control circuit 13.

The speed mode changeover switch 9 is a well-known push-button switch which is in a constantly open state, and a predetermined input port of the control circuit 13 is connected to one end of the speed mode changeover switch 9 and the control voltage Vcc is applied to the one end of the speed mode changeover switch 9 through a resistor R1.

The other end of the speed mode changeover switch 9 is connected to a ground line which is set to a reference potential (0 V) in the electric power tool 1. In the first embodiment, an electric potential of a negative electrode of the battery 18 is set to the reference potential since the ground line is connected to the negative electrode of the battery 18.

That is, a binary voltage signal (a speed mode changeover signal), in which a voltage value is set to a value near the control voltage Vcc or a value near 0 V in accordance with an operating state of the speed mode changeover switch 9, is inputted to the control circuit 13.

More specifically, in a normal state, since a contact of the speed mode changeover switch 9 is opened, a logic level of a voltage of the speed mode changeover signal is a High level (near the control voltage Vcc). On the other hand, when an operator presses the speed mode changeover switch 9 and thereby the contact of the speed mode changeover switch 9 is closed, the logic level of the voltage of the speed mode changeover signal becomes a Low level (near 0 V). When the operator releases the speed mode changeover switch 9, the speed mode changeover switch 9 returns to the open state by means of an elastic force of a not-shown spring.

The trigger switch 10 includes a drive start switch 16 and a variable resistor 17.

The drive start switch 16 is a switch for detecting whether or not the trigger switch 10 is pulled. A predetermined input port of the control circuit 13 is connected to one end of the drive start switch 16 and the control voltage Vcc is applied to the one end of the drive start switch 16 through a resistor R2. Also a ground line is connected to the other end of the drive start switch 16.

That is, a binary voltage signal (a drive start signal), in which a voltage value is set to a value near 0 V or a value near the control voltage Vcc depending on whether or not the trigger switch 10 is pulled, is inputted to the control circuit 13.

The variable resistor 17 is a well-known potentiometer for detecting the operation amount (the pulled amount) of the trigger switch 10. More specifically, the variable resistor 17 is connected to an output terminal of the regulator 15 (an output terminal for the control voltage Vcc), the ground line, and the control circuit 13 such that a voltage signal (a trigger operation amount signal) with a voltage varying from near 0 V to near the control voltage Vcc in accordance with the operation amount of the trigger switch 10 is inputted to a predetermined input port of the control circuit 13.

The rotational position sensor 14 includes at least one Hall device, and outputs a pulse signal to the control circuit 13 each time a rotational position of the rotor of the motor 20 has reached a predetermined rotational position of the motor 20 (that is, the motor 20 is rotated by a predetermined amount).

Specifically, in the drive device 11 configured as described above, when the operator starts pulling the trigger switch 10 (for example, pulls by a small amount), the drive start switch 16 is turned on, and the logic level of the voltage of the drive start signal becomes the Low level (near 0 V). When the logic level of the voltage of the drive start signal becomes the Low level, the control circuit 13 outputs to the gate circuits 21 to 26 control signals depending on a value of a voltage of the trigger operation amount signal inputted from the variable resistor 17, to turn on/off the switching devices Q1 to Q6 in the motor drive circuit 12 to thereby start the motor 20. The control circuit 13 calculates a rotational position and a rotation speed of the motor 20 based on a pulse signal from the rotational position sensor 14, and controls the motor 20 through the gate circuits 21 to 26 and the motor drive circuit 12 such that the calculated rotation speed coincides with a set rotation speed which is determined depending on operating states of the speed mode changeover switch 9 and the trigger switch 10.

More specifically, the control circuit 13 sets a duty ratio of a voltage (drive voltage) to be applied to each of the terminals U, V, W of the motor 20 through the gate circuits 21 to 26 and the motor drive circuit 12 such that, as the pulled mount of the trigger switch 10 is larger, the rotation speed becomes higher up to a highest rotation speed corresponding to the speed mode set by the speed mode changeover switch 9 as an upper limit.

In the first embodiment, as shown in FIG. 3, the pulled amount (LEVEL) of the trigger switch 10 is divided into 20 levels (LEVEL 1 to LEVEL 20), and each duty ratio (DUTY) is set to each level (LEVEL). The DUTY corresponding to the pulled amount (LEVEL) of the trigger switch 10 is set such that the DUTY increases (partly unchanged) as the pulled amount is increased in each of the speed modes.

However, a tendency of increase/decrease in the DUTY (that is, a change rate of the rotation speed of the motor 20) varies depending on each speed mode. In a case where the speed mode is set to the high speed mode, the DUTY increases toward an NHmax (100% in the first embodiment), which is a maximum DUTY, as the pulled amount of the trigger switch 10 increases. When the operator pulls the trigger switch 10 by a maximum amount, the DUTY becomes the maximum DUTY, NHmax. In a case where the speed mode is set to the medium speed mode, the DUTY increases toward an NMmax (65% in the first embodiment), which is the maximum DUTY, as the pulled amount of the trigger switch 10 increases. When the operator pulls the trigger switch 10 by a maximum amount, the DUTY becomes the maximum DUTY, NMmax. In a case where the speed mode is set to the low speed mode, the DUTY increases toward an NLmax (38% in the first embodiment) which is the maximum DUTY as the pulled amount of the trigger switch 10 increases. When the operator pulls the trigger switch 10 by a maximum amount, the DUTY becomes the maximum DUTY, NLmax.

The changes of the DUTY shown in FIG. 3 schematically represent the tendency of changes of the DUTY with respect to the pulled amount of the trigger switch 10. Specific values of the DUTY with respect to the pulled amount are set in tables stored in the memory 132 of the control circuit 13. As shown in FIGS. 4A to 4C, three tables corresponding to the respective speed modes are stored in the memory 132 in the first embodiment, and the DUTY (the duty ratio) and an after-mentioned lock determination time Tr corresponding to the pulled amount (LEVEL) of the trigger switch 10 are set in each of the tables.

The control circuit 13 also determines whether or not a lock state of the motor 20 has occurred based on the pulse signal from the rotational position sensor 14. More specifically, if the lock state of the motor 20 has occurred due to, for example, an abnormality in the impact mechanism during use of the electric power tool 1, there occurs an abnormal state in which an overcurrent flows in the motor 20. Accordingly, if the lock state has occurred, it is required to promptly perform a protective operation such as interrupting current conduction.

In one method for determining whether or not the lock state has occurred, the lock determination time Tr to be used as a determination criterion is previously set, and it is determined that the lock state has occurred when the pulse signal from the rotational position sensor 14 is not inputted within the lock determination time Tr.

From the viewpoint of changes of the rotation speed with respect to the duty ratio, the rotation speed becomes higher and a number of pulse signals per unit time inputted from the rotational position sensor 14 to the control circuit 13 becomes larger as the duty ratio is larger. Accordingly, in a case where the duty ratio is larger, the lock determination time Tr may be set relatively shorter. Assuming that the lock determination time Tr is too long, if the lock state occurs while the duty ratio is large, there is a possibility that it is not immediately determined that the lock state has occurred despite the fact that a large overcurrent is continuing to flow in the motor 20, and thereby the motor 20 is damaged.

On the other hand, the rotation speed becomes lower and the number of pulse signals per unit time inputted from the rotational position sensor 14 to the control circuit 13 also becomes smaller as the duty ratio is smaller. Accordingly, in a case where the duty ratio is smaller, the lock determination time Tr may be set relatively longer. Assuming that the lock determination time Tr is too short, if the duty ratio is small, there is a possibility that a false determination that the lock state has occurred is made despite the fact that the motor 20 is rotating normally at a low speed without occurrence of the lock state.

In the first embodiment, therefore, the lock determination time Tr is changed such that the lock determination time Tr becomes shorter as the duty ratio is larger. Specifically, as shown in FIGS. 4A to 4C, each lock determination time Tr corresponding to each DUTY is set such that the lock determination time Tr becomes shorter as the DUTY is larger, or in other words, such that the lock determination time Tr becomes longer as the DUTY is smaller, depending on the pulled amount (LEVEL) of the trigger switch 10. However, the value of the DUTY corresponding to the pulled amount (LEVEL) of the trigger switch 10 and the value of the lock determination time are set differently for each of the speed modes. More specifically, as shown in FIG. 4A, in the table for the low speed mode, values of the lock determination time Tr are set such that the lock determination time Tr becomes continuously shorter as the pulled amount of the trigger switch 10 is larger when the pulled amount exceeds a predetermined value (LEVEL 4). Also as shown in FIGS. 4B and 4C, in the table for the medium speed mode and the table for the high speed mode, values of the lock determination time Tr are set such that the lock determination time Tr becomes shorter in a stepwise manner as the pulled amount of the trigger switch 10 is larger when the pulled amount exceeds a predetermined value (LEVEL 3).

A description will be provided hereinafter of various processes to be executed by the CPU 131 of the control circuit 13 to achieve operation of the aforementioned control circuit 13.

When the battery pack 6 is attached to the electric power tool 1 and the control voltage Vcc is applied to the control circuit 13, the CPU 131 is activated and executes a main routine shown in FIG. 5.

As shown in FIG. 5, an initialization process (S10) to initialize the memory 132 is first performed in the present main routine. In S10, the CPU 131 initializes information to be initialized among various information stored in the memory 132.

Figure 8:
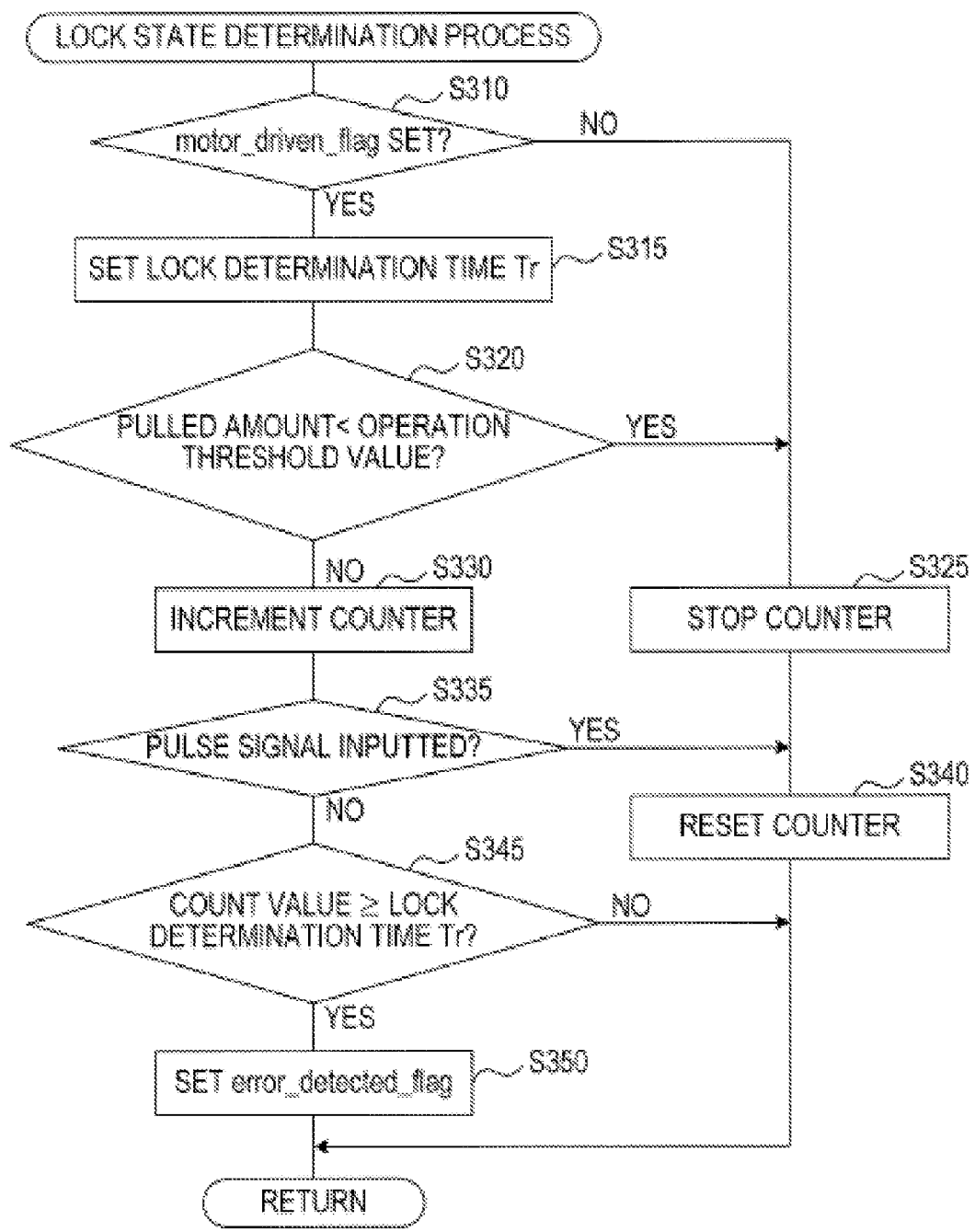
FIG. 8 is a flowchart showing a flow of a lock state determination process in the main routine.

When the initialization process is terminated, a later-described trigger switch information acquisition process (S20) shown in FIGS. 6A and 6B, a later-described motor control process (S30) shown in FIG. 7, and a later-described lock state determination process (S40) shown in FIG. 8 are serially performed repeatedly.

Figure 6B:
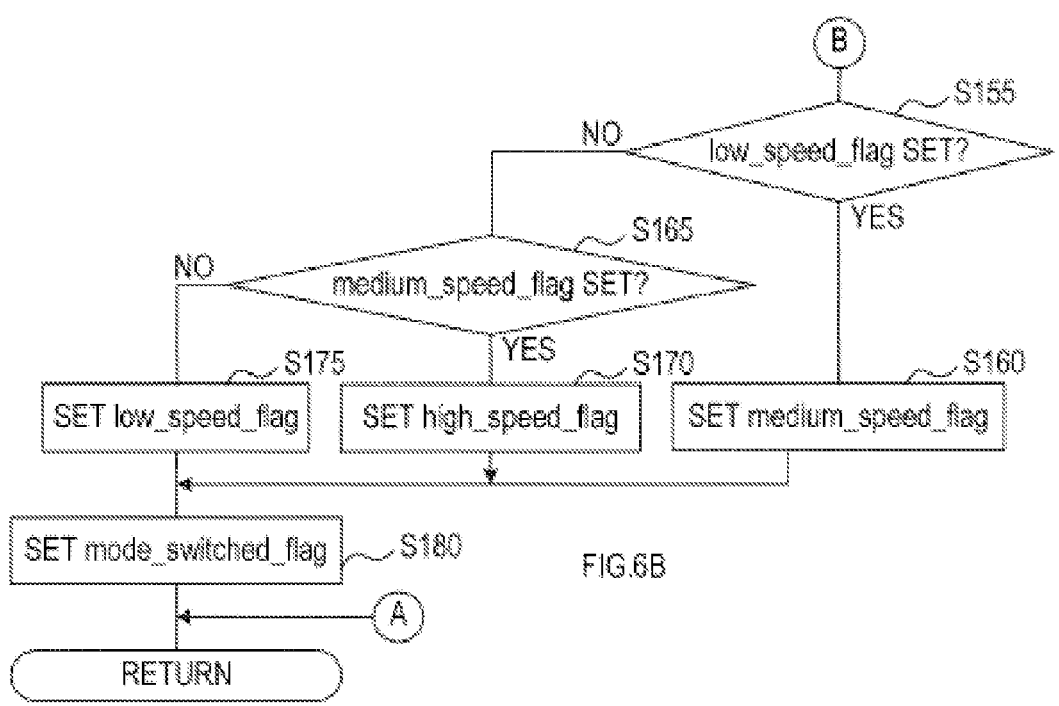
FIG. 6B is a flowchart showing a flow of a repaining part of the trigger switch information acquisition process.

In the trigger switch information acquisition process, as shown in FIGS. 6A and 6B, it is first determined whether or not the trigger switch 10 is pulled based on the logic level of the voltage of the aforementioned drive start signal (S110). When the trigger switch 10 is pulled (S110: YES), a flag (trigger_on_flag) indicating that the trigger switch 10 is pulled is set (S115). Then the present process proceeds to a later-described S130.

When the trigger switch 10 is not pulled in S110 (S110: NO), the trigger_on_flag is cleared (S120), and a flag (error_detected_flag) indicating that occurrence of the aforementioned abnormal state has been detected is cleared (S125), and then a pulled amount detection process to detect the pulled amount of the trigger switch 10 is performed (S130). In the pulled amount detection process, the CPU 131 detects the pulled amount of the trigger switch 10 based on the voltage of the aforementioned trigger operation amount signal, and stores the detected pulled amount in a predetermined storage area (a pulled amount storage area) in the memory 132.

When the pulled amount detection process is terminated, it is determined whether or not the trigger_on_flag is set (S135).

When the trigger_on_flag is set (S135: YES), the present trigger switch information acquisition process is immediately terminated.

On the other hand, when the trigger_on_flag is not set (S135: NO), it is determined whether or not the speed mode changeover switch 9 is pressed based on the logic level of the voltage of the aforementioned speed mode changeover signal (S140). When the speed mode changeover switch 9 is not pressed (S140: NO), a flag (mode_switched_flag) indicating completion of a changeover of the speed mode is cleared (S145), and the present trigger switch information acquisition process is immediately terminated. On the other hand, when the speed mode changeover switch 9 is pressed (S140: YES), it is determined whether or not the mode_switched_flag is set (S150).

When the mode_switched_flag is set (S150: YES), the present trigger switch information acquisition process is immediately terminated, while when the mode_switched_flag is not set (S150: NO), it is determined whether or not a flag (low_speed_flag) indicating that the speed mode is set to the low speed mode is set (S155).

When the low_speed_flag is set (S155: YES), the low_speed_flag is cleared, and a flag (medium_speed_flag) indicating that the speed mode is set to the medium speed mode is set (S160), and the process proceeds to a later-described S180.

When the low_speed_flag is not set in S155 (S155: NO), it is determined whether or not the medium_speed_flag is set (S165).

When the medium_speed_flag is set (S165: YES), the medium_speed_flag is cleared, and a flag (high_speed_flag) indicating that the speed mode is set to the high speed mode is set (S170), and the present process proceeds to a later-described S180.

When the medium_speed_flag is not set in S165, that is, when the medium_speed_flag is cleared and the high_speed_flag is set (S165: NO), the high_speed_flag is cleared and the low_speed_flag is set (S175). Subsequently, the mode_switched_flag is set (S180), and the present trigger switch information acquisition process is terminated.

As shown in FIG. 7, in the motor control process, it is first determined whether or not the error_detected_flag is set (S210).

When the error_detected_flag is set (S210: YES), the present process proceeds to a later-described S230, while when the error_detected_flag is not set (S210: NO), it is determined whether or not the aforementioned trigger_on_flag is set (S220).

When the trigger_on_flag is not set (S220: NO), a motor stopping process to stop the motor 20 is performed (S230). In the motor stopping process, the CPU 131 may stop the motor 20 by performing counter-current braking to brake the motor 20 by turning on/off the switching devices Q1 to Q6 of the motor drive circuit 12 through the gate circuits 21 to 26 so as to supply a current of reverse polarity with respect to a current at the present moment to respective coils of the motor 20. Alternatively, the CPU 131 may stop the motor 20 by performing regenerative braking to brake the motor 20 by turning on/off the switching devices Q1 to Q6 of the motor drive circuit 12 through the gate circuits 21 to 26 so as to connect both ends of each of the coils of the motor 20 to the positive electrode or the negative electrode of the battery 18. Alternatively, the CPU 131 may stop the motor 20 by performing both of counter-current braking and regenerative braking in a cooperative manner. Alternatively, the CPU 131 may stop the motor 20 by turning off all of the switching devices Q1 to Q6 of the motor drive circuit 12 through the gate circuits 21 to 26 to thereby stop current supply from the battery 18 to the motor 20.

When the motor stopping process is terminated, a flag (motor_driven_flag) indicating that the motor 20 is driven is cleared (S240), and the present motor control process is terminated.

When the trigger_on_flag is set in S220 (S220: YES), setting of the duty ratio of the drive voltage is performed (S250).

More specifically, the CPU 131 selects in S250 a table corresponding to the currently set speed mode based on states of the low_speed_flag, the medium_speed_flag, and the high_speed_flag, and determines a duty ratio corresponding to the pulled amount stored in the pulled amount storage area based on the selected table. The determined duty ratio is set in a predetermined storage area (a duty ratio storage area) in the memory 132 by the CPU 131. Not only the duty ratio set this time but also a duty ratio set last time is stored in the duty ratio storage area.

Setting of the duty ratio is terminated, a motor drive process to drive the motor 20 is performed (S260). In the motor drive process, the CPU 131 drives the motor 20 by turning on/off the switching devices Q1 to Q6 of the motor drive circuit 12 through the gate circuits 21 to 26 such that the drive voltage having the duty ratio currently set to the duty ratio storage area is applied to the respective terminals U, V, and W of the motor 20.

When the motor drive process is terminated, the aforementioned motor_driven_flag is set (S270), and the present motor control process is terminated.

In the lock state determination process, as shown in FIG. 8, it is first determined whether or not the motor_driven_flag is set (S310). When the motor_driven_flag is not set (S310: NO), the present process proceeds to a later-described S325.

When the motor_driven_flag is set (S310: YES), setting of the lock determination time Tr is performed (S315).

More specifically, in S315, the CPU 131 selects a table corresponding to the currently set speed mode based on the states of the low_speed_flag, the medium_speed_flag, and the high_speed_flag, and determines a lock determination time Tr corresponding to the duty ratio currently set in the duty ratio storage area based on the selected table. The determined lock determination time Tr is set in a predetermined storage area (a determination time storage area) in the memory 132 by the CPU 131.

When setting of the lock determination time Tr is terminated, it is determined whether or not the pulled amount stored in the pulled amount storage area is less than a predetermined threshold value of the pulled amount (an operation threshold value) (S320). In the first embodiment, such a minimum pulled amount is set as the operation threshold value that prevents a false determination that the motor 20 has been locked despite the fact that motor 20 has not been locked due to a long time required for the motor 20 to rotate by a predetermined amount.

When the pulled amount stored in the pulled amount storage area is less than the operation threshold value (S320: YES), a counter for counting, as a count value, an elapsed time required for the motor 20 to rotate by a predetermined amount is stopped (S325), and the present process proceeds to a later-described S340. More specifically, the counter in the first embodiment is constituted by the aforementioned timer 135 built in the control circuit 13 and a process to increment the count value set in a predetermined storage area (a counter area) in the memory 132. In S325 of the first embodiment, the CPU 131 stops the timer 135.

When the pulled amount stored in the pulled amount storage area is equal to or more than the operation threshold value in S320 (320: NO), the counter is incremented (S330). In S330 of the first embodiment, the timer value of the aforementioned timer 135 is reset to an initial value ("zero" in the first embodiment), while the timer 135 is brought into operation if the timer 135 is stopped. If the timer 135 is in operation and the timer value of the timer 135 is less than a predetermined threshold value (a timer threshold value), the operation of the timer 135 is continued. If the timer value of the timer 135 has reached the timer threshold value, the count value set in the counter area is incremented. In the first embodiment, an initial value of the count value of the counter area is set to zero. Also in the first embodiment, a value, which is smaller than the lock determination time Tr corresponding to the maximum duty ratio in the high speed mode and which the timer value cannot reach in the maximum duty ratio in the high speed mode when the lock state has not occurred, is set as the timer threshold value.

After incrementing the counter as described above, it is determined whether or not a pulse signal has been inputted from the rotational position sensor 14 (S335).

When the pulse signal has been inputted (S335: YES), the counter is reset (S340), and the present lock state determination process is terminated. In S340 of the first embodiment, the counter is reset by rewriting both the timer value of the timer 135 and the count value set in the counter area with respective initial values.

When the pulse signal has not been inputted in S335 (S335: NO), it is determined whether or not the count value of the counter has reached the lock determination time Tr stored in the determination time storage area (S345). In S345 of the first embodiment, it is determined whether or not the count value in the counter area has reached the lock determination time Tr.

When the count value of the counter has not reached the lock determination time Tr (S345: NO), the present lock state determination process is immediately terminated, while when the count value of the counter has reached the lock determination time Tr (S345: YES), the aforementioned error_detected_flag is set (S350), and then the present lock state determination process is terminated.

In the electric power tool 1, by executing the above described processes with the CPU 131, the count value of the counter is retained without being updated (that is, counting operation by the counter is stopped), and also the count value is rewritten with the initial value (that is, the count value of the counter is reset to the initial value) in a case where the pulled amount of the trigger switch 10 received as the operation input to operate the rotation speed of the motor 20 is so small that a false determination occurrence of a lock state is caused.

In other words, in the electric power tool 1, in the case where the pulled amount of the trigger switch 10 is so small that a false determination of occurrence of a lock state is caused, continuation of counting operation by the counter is invalidated, and the count value of the counter is suppressed from reaching the lock determination time Tr, and thus it is possible to suppress a false determination of occurrence of a lock state from being caused due to the small pulled amount of the trigger switch 10.

Also, in the electric power tool 1, the set lock determination time Tr becomes continuously or stepwise shorter as the rotation speed of the motor 20 is higher. Thus, it is possible to appropriately determine that the lock state has occurred.

Further, in the electric power tool 1, the value, which is smaller than the lock determination time Tr corresponding to the maximum duty ratio in the high speed mode and which the timer value cannot reach in the maximum duty ratio in the high speed mode when the lock state has not occurred, is set as the timer threshold value. Thus, it is possible to suppress the count value of the counter from being incremented uselessly despite the fact that the lock state obviously has not occurred.

In the electric power tool 1, since the motor 20 is stopped when the lock state has occurred, it is possible to suppress damage of the motor 20 (for example, burnout of the coils of the motor 20) resulting from the lock state.

In the electric power tool 1, the drive voltage to be applied to the respective terminals U, V, and W of the motor 20 is PWM controlled. It is, therefore, possible to control the rotation speed of the motor 20 without causing a significant loss of electric power to be supplied to the motor 20.

Also, in the electric power tool 1, it is possible to perform a speed increasing operation, a constant speed operation, and a speed decreasing operation of the rotation speed of the motor 20 by changing the position (the pulled amount) of the trigger switch 10, and also possible to set a rate of change of the rotation speed of the motor 20 and the maximum value of the rotation speed of the motor 20 by pressing the speed mode changeover switch 9. Thus, the operator of the electric power tool 1 can operate the electric power tool 1 in a more preferable manner.

In the first embodiment, the motor 20 is an example of a motor in in the present invention, a combination of the speed mode changeover switch 9 and the trigger switch 10 is an example of an operation input receiving device of the present invention, a combination of the CPU 131 executing S30 in the main routine, the gate circuits 21 to 26, and the motor drive circuit 12 is an example of a rotation speed control device of the present invention, a combination of the timer 135 and the CPU 131 executing S330 in the lock state determination process is an example of a counter in the present invention. More specifically, the timer 135 is an example of a first sub-counter in the present invention, and the CPU 131 incrementing the count value in the counter area in S330 in the lock state determination process is an example of a second sub-counter in the present invention.

The CPU 131 executing S335 and S340 in the lock state determination process is an example of a reset device of the present invention, the CPU 131 executing S315 of the lock state determination process is an example of a reference time changing device of the present invention, and the CPU 131 executing S345 and S350 in the lock state determination process is an example of a lock state determination device of the present invention.

The CPU 131 executing S320, S325, and S340 in the lock state determination process is an example of an invalidation device of the present invention, and the CPU 131 executing S230 in the motor control process is an example of a motor stopping device of the present invention.

The trigger switch 10 is an example of a first switch of the present invention, while the speed mode changeover switch 9 is an example of a second switch of the present invention.

Second Embodiment

A second embodiment of the present invention will be illustrated hereinafter.

The second embodiment is the same as the first embodiment except the lock state determination process.

For simplification purposes, therefore, a description will be made here only with respect to the lock state determination process in the second embodiment.

Figure 9:
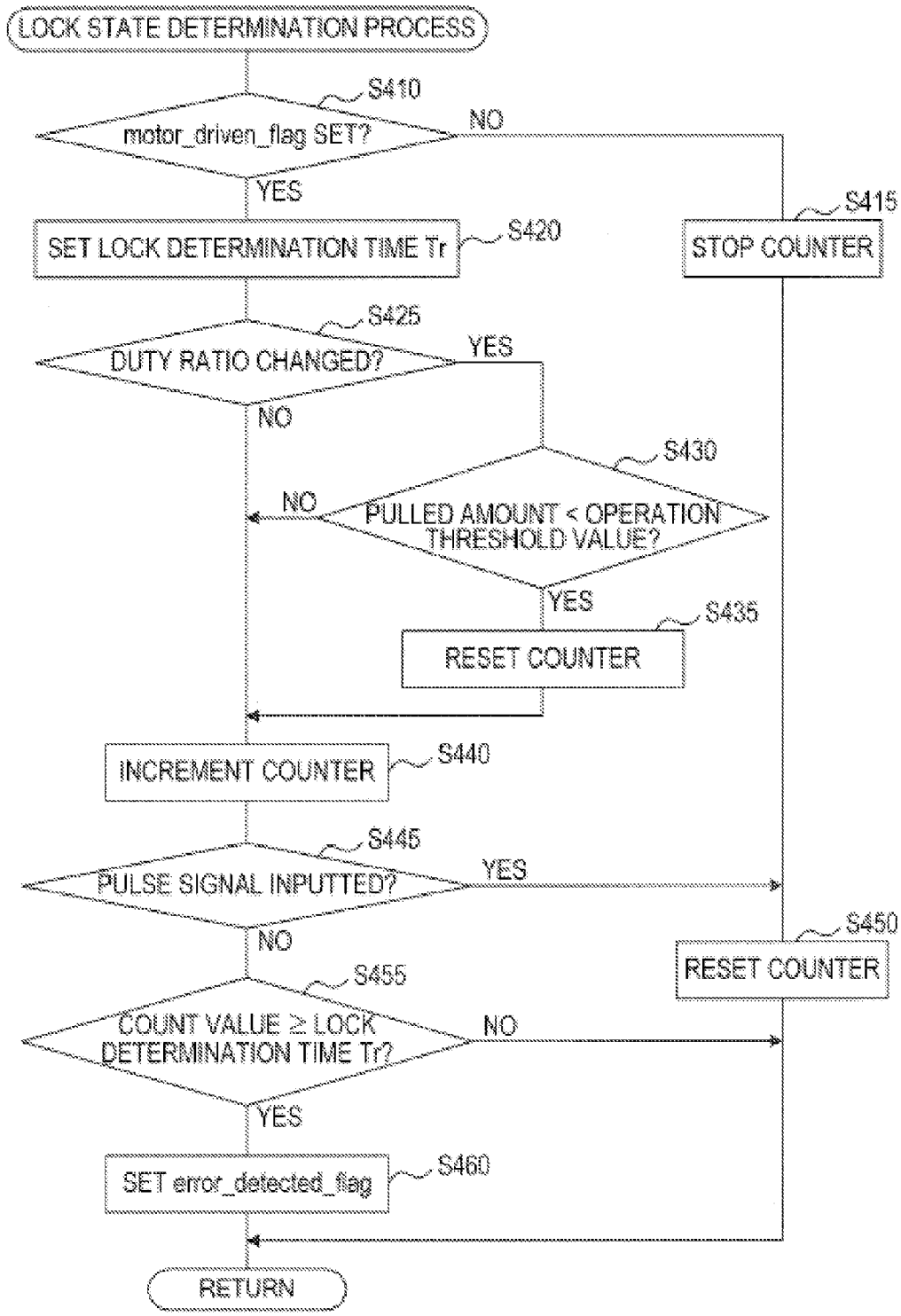
FIG. 9 is a flowchart showing a flow of a lock state determination process in a second embodiment.

In the lock state determination process of the second embodiment as shown in FIG. 9, it is first determined whether or not the motor_driven_flag is set (S410). When the motor_driven_flag is not set (S410: NO), the counter is stopped (S415) in a same manner as in S325 of the first embodiment, and process proceeds to a later-described S450.

When the motor_driven_flag is set (S410: YES), setting of the lock determination time Tr is performed (S420) in a same manner as in S315 of the first embodiment.

When setting of the lock determination time Tr is terminated, it is determined whether or not the duty ratio has been changed by comparing a currently set duty ratio and a previously set duty ratio stored in the duty ratio storage area (S425). In S425, the CPU 131 may determine that the duty ratio has been changed in a case where the compared duty ratios are different, or may determine that the duty ratio has been changed in a case where the compared duty ratios are different and also a difference between the compared duty ratios is equal to or larger than a predetermined amount.

When the duty ratio has not been changed (S425: NO), the present process proceeds to a later-described S440, while when the duty ratio has been changed (S425: YES), it is determined whether or not the pulled amount stored in the pulled amount storage area is less than an operation threshold value (S430) in a same manner as in S320 of the first embodiment.

When the pulled amount stored in the pulled amount storage area is equal to or larger than the operation threshold value (S430: NO), the present process proceeds to a later-described S440, while when the pulled amount stored in the pulled amount storage area is less than the operation threshold value (S430: YES), the count value of the counter is reset to an initial value (S435) in a same manner as in S340 of the first embodiment.

After the count value of the counter is reset to the initial value, the counter is incremented (S440) in a same manner as in S330 of the first embodiment, and it is determined whether or not a pulse signal is inputted from the rotational position sensor 14 (S445) in a same manner as in S335 of the first embodiment.

When a pulse signal is inputted (S445: YES), the counter is reset (S450) as in aforementioned S435, and the present lock state determination process is terminated.

When a pulse signal is not inputted in S445 (S445: NO), it is determined whether or not the count value of the counter has reached the lock determination time Tr stored in the determination time storage area (S455) in a same manner as in S345 of the first embodiment.

When the count value has not reached the lock determination time Tr (S455: NO), the present lock state determination process is immediately terminated, while when the count value has reached the lock determination time Tr (S455: YES), the error_detected_flag is set (S460) in a same manner as in S350 of the first embodiment, and then the present lock state determination process is terminated.

In the electric power tool of the second embodiment, by executing the above-described lock state determination process, in a case where the pulled amount of the trigger switch 10 is less than the operation threshold value, the counter is reset and continuation of the counting operation by the counter is invalidated when at least one of the pulled amount and the speed mode received as operation inputs is changed and thereby the duty ratio is changed.

That is, in the second embodiment, in a case where a false determination of occurrence of a lock state is caused by at least one of a changing operation of the pulled amount of the trigger switch 10 and a changeover operation of the speed mode, it is possible to suppress occurrence of a false determination by invalidating continuation of the counting operation by the counter.

In the second embodiment, the CPU 131 executing S440 in the lock state determination process is in example of the counter of the present invention, and the CPU 131 executing S445 and S450 in the lock state determination process is an example of the reset device of the present invention.

Also, the CPU 131 executing S420 in the lock state determination process is an example of the reference time changing device of the present invention, the CPU 131 executing S455 and S460 in the lock state determination process is an example of the lock state determination device of the present invention, and the CPU 131 executing S425, S430, and S435 in the lock state determination process is an example of the invalidation device of the present invention.

Third Embodiment

Next, a third embodiment of the present invention will be described.

The third embodiment is the same as the second embodiment except that a flow of the lock state determination process is different from that in the second embodiment and that a later-described counter process is added.

For simplification purposes, therefore, descriptions will be made here only with respect to the lock state determination process and the counter process in the third embodiment.

The counter process in the third embodiment is activated by a later-described lock state determination process and is executing independently of the lock state determination process.

Figure 10:
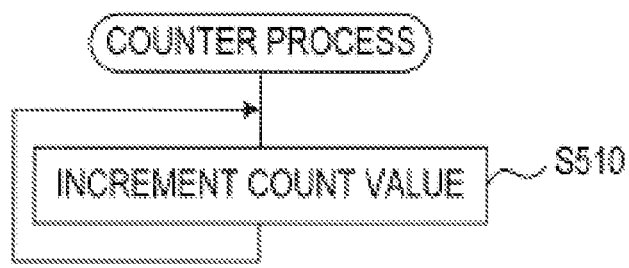
FIG. 10 is a flowchart showing a flow of a counter process executed by a CPU in a third embodiment.

In the counter process, as shown in FIG. 10, increment of the count value of the counter (S510) is repeatedly performed. More specifically, in S510, the timer value of the aforementioned timer 135 is reset to an initial value (zero in the third embodiment), while the timer 135 is activated when the timer 135 is stopped. When the timer 135 is in operation and the timer value of the timer 135 is less than a predetermined timer threshold value, the operation of the timer 135 is continued. Also, when the timer value of the timer 135 has reached the timer threshold value, the count value set in the counter area is incremented. In the third embodiment, an initial value of the count value in the counter area is set to zero. Further, in the third embodiment, a value, which is smaller than the lock determination time Tr corresponding to the maximum duty ratio in the high speed mode and also which cannot be reached by the timer value when a lock state does not occur at the maximum duty ratio in the high speed mode, is set as the timer threshold value.

In the lock state determination process in the third embodiment, as shown in FIG. 11, it is first determined whether or not the motor_driven_flag is set (S610) in a same manner as in S410 of the second embodiment, and the process proceeds to a later-described S640 when the motor_driven_flag is not set (S610: NO).

When the motor_driven_flag is set (S610: YES), a lock determination time Tr is set (S615) in a same manner as in S420 of the second embodiment.

When setting of the lock determination time Tr is terminated, it is then determined whether or not the aforementioned counter process has been activated (S620).

When the counter process has been activated (S620: YES), the process proceeds to a later-described S630, while when the counter process has not been activated (S620: NO) the counter process is activated (S625).

After the counter process is activated, it is determined whether or not the duty ratio has been changed (S630), in a same manner as in S425 of the second embodiment, by comparing the duty ratio currently set and the duty ratio set last time stored in the duty ratio storage area.

When the duty ratio has been changed (S630: YES), the process proceeds to a later-described S640, while when the duty ratio has not been changed (S630: NO), it is determined whether or not a pulse signal is inputted from the rotational position sensor 14 (S635) in a same manner as in S445 of the second embodiment.

When a pulse signal is inputted (S635: YES), the counter process is stopped (S640), and subsequently the count value of the counter is reset to an initial value (S645). Then the present lock state determination process is terminated. In S645 of the third embodiment, the count value of the counter is reset to the initial value by rewriting both the timer value of the timer 135 and the count value set in the counter area with respective initial values.

When a pulse signal is not inputted in S635 (S635: NO), it is determined whether or not the count value of the counter has reached the lock determination time Tr stored in the determination time storage area (S650) in a same manner as in S455 of the second embodiment.

When the count value has not reached the lock determination time Tr (S650: NO), the present lock state determination process is immediately terminated, while when the count value has reached the lock determination time Tr (S650: YES), the error_detected_flag is set (S655) in a same manner as in S460 of the second embodiment, and then the present lock state determination process is terminated.

As a result of execution of the above-described counter process and lock state determination process, in the electric power tool of the third embodiment, when at least one of the pulled amount and the speed mode received as operation inputs is changed and thereby the duty ratio is changed, not only the counter is reset to invalidate continuation of the counting operation by the counter but also determination as to whether or not the count value of the counter has reached the lock determination time Tr is invalidated without performing such determination.

That is, it is possible to suppress occurrence of a false determination by performing these two types of invalidation in the third embodiment.

In the third embodiment, the CPU 131 executing S510 of the counter process is an example of the counter in the present invention, the CPU 131 executing S635 and S645 in the lock state determination process is an example of the reset device of the present invention.

Also, the CPU 131 executing S615 of the lock state determination process is an example of the reference time changing device of the present invention, the CPU 131 executing S650 and S655 in the lock state determination process is an example of the lock state determination device of the present invention, and the CPU 131 executing S630, S640, and S645 in the lock state determination process is an example of the invalidation device of the present invention.

Although the embodiments of the present invention have been described above, it is obvious that the present invention is not limited to the the above-described embodiments but may be in various forms within the technical scope of the present invention.

For example, the present invention may be applied to any electric power tool other than an impact driver.

Also, the present invention may be applied not only to a battery-type electric power tool such as the electric power tool 1 but to an electric power tool supplied with electric power through a cord.

Further, the motor 20 may be constituted as a two-phase brushless direct current motor or a four or more-phase brushless direct current motor.

The motor 20 may be configured to detect the rotational position of the motor based on an induced electric power induced in the coils of the motor 20. In this case, the electric power tool 1 may be provided with a detection circuit for detecting the induced electric power induced in the coils of the motor 20. Also, in S335 in the lock state determination process of the first embodiment, in S445 in the lock state determination process of the second embodiment, and in S635 in the lock state determination process of the third embodiment, it may be possible to determine whether or not the motor 20 has rotated by a predetermined amount by determining whether or not an induced electric power in a case of a determination amount of rotation of the motor 20 is generated.

Further, each of the switching devices Q1 to Q6 may be a switching device other than a MOSFET (such as a bipolar transistor).

Moreover, the control circuit 13 may be an ASIC (Application Specific Integrated Circuit), a programmable logic device, such as an FPGA (Field Programmable Gate Array), or a discrete circuit.

Programs for aforementioned various processes may be stored in a recording medium in form readable by the CPU 131 and used. The recording medium includes, for example, a portable semiconductor memory (such as a USB memory, a Memory Card (registered trademark)) and the like.

The tool bit may be attached to the chuck sleeve 8 in an undetachable manner.

The lock state determination process of the second embodiment may be such that when the pulled amount stored in the pulled amount storage area is less than the operation threshold value in S430, the process proceeds to S440, while when the pulled amount stored in the pulled amount storage area is equal to or more than the operation threshold value, the process proceeds to S435.

In S345, S455, and S650 in the lock state determination process of the first to third embodiments, it may be determined whether or not a sum of the timer value of the timer 135 and the count value in the counter area has reached the lock determination time Tr.

The counter may be constituted only by the timer 135, or may be constituted only by a processing to increment the count value of the counter.

Also, the timer 135 may be configured to increment the timer value based on any electrical signal, which periodically changes, other than a clock signal.

Moreover, the present invention may be applied to an electric power tool configured to rotationally drive a tool element with an alternate current motor.

The invention claimed is:

1. An electric power tool comprising:
a motor that rotationally drives a tool element;
an operation input receiving device that receives an operation input to operate a rotation speed of the motor from an operator of the electric power tool;
a rotation speed control device that controls the rotation speed of the motor in accordance with the operation input inputted through the operation input receiving device;
a counter that performs a counting operation to count, as a count value, an elapsed time required for the motor to rotate by a predetermined amount;
a reset device that resets the count value of the counter to an initial value when the motor rotates by the predetermined amount;
a reference time changing device that changes a reference time, which is used as a determination criterion to determine whether or not a lock state of the motor has occurred, in accordance with the operation input inputted through the operation input receiving device;
a lock state determination device that determines that the lock state has occurred when the count value of the counter has reached the reference time; and
an invalidation device that performs, in a case where a false determination of occurrence of the lock state is caused due to the operation input inputted through the operation input receiving device, at least one of a first invalidation operation to invalidate the lock state determination device and a second invalidation operation to invalidate continuation of the counting operation by the counter.

2. The electric power tool according to claim 1, wherein the invalidation device performs the second invalidation operation by performing at least one of a stopping operation to stop the counting operation by the counter and a resetting operation to reset the count value of the counter to the initial value.

3. The electric power tool according to claim 1,
wherein the invalidation device performs, in a case where the operation input inputted through the operation input receiving device is an operation input within a predetermined specified range, at least one of the first invalidation operation and the second invalidation operation.

4. The electric power tool according to claim 1, wherein the invalidation device performs, in a case where the operation input inputted through the operation input receiving device has changed by a predetermined specified amount, at least one of the first invalidation operation and the second invalidation operation.

5. The electric power tool according to claim 1, wherein the reference time changing device performs at least one of a continuously changing operation to continuously change the reference time in accordance with the operation input inputted through the operation input receiving device, and a stepwisely changing operation to stepwisely change the reference time in accordance with the operation input inputted through the operation input receiving device.

6. The electric power tool according to claim 1, wherein the reference time changing device changes the reference time such that the reference time becomes shorter as the rotation speed of the motor, which is in accordance with the operation input inputted through the operation input receiving device, is higher.

7. The electric power tool according to claim 1, wherein the counter includes:
a first sub-counter that increments a previously set timer value based on an electrical signal which periodically changes; and
a second sub-counter that repeatedly increments the count value of the counter set in a previously secured storage area each time the timer value has reached a previously set threshold value.

8. The electric power tool according to claim 1, further comprising:
a motor stopping device that stops the motor when the lock state determination device determines that the lock state has occurred.

9. The electric power tool according to claim 1, wherein the rotation speed control device controls the rotation speed of the motor by performing PWM control of a voltage to be applied to the motor in order to rotationally drive the motor, in accordance with the operation input inputted through the operation input receiving device.

10. The electric power tool according to claim 1, wherein the operation input receiving device includes:
 a first switch that receives one of a speed increasing operation, a constant speed operation, and a speed decreasing operation of the rotation speed of the motor as the operation input; and
 a second switch that receives a setting operation to set at least one of a rate of change of the rotation speed of the motor and a maximum value of the rotation speed of the motor as the operation input,
 wherein the rotation speed control device controls the rotation speed of the motor in accordance with the operation input inputted through the first switch and the operation input inputted through the second switch.

11. The electric power tool according to claim 10, wherein the first switch is configured to be movable among a plurality of positions so as to receive a position of the first switch as the operation input.

12. A lock state occurrence determination apparatus comprising:
 a counter that performs a counting operation to count, as a count value, an elapsed time required for a motor, which is to rotationally drive a tool element of an electric power tool, to rotate by a predetermined amount;
 a reset device that resets the count value of the counter to an initial value when the motor rotates by the predetermined amount;
 a reference time changing device that changes a reference time, which is used as a determination criterion to determine whether or not a lock state of the motor has occurred, in accordance with an operation input inputted by an operator of the electric power tool to operate a rotation speed of the motor;
 a lock state determination device that determines that the lock state has occurred when the count value of the counter has reached the reference time; and
 an invalidation device that performs, in a case where a false determination of occurrence of the lock state is caused due to the operation input, at least one of a first invalidation operation to invalidate the lock state determination device and a second invalidation operation to invalidate continuation of the counting operation by the counter.

13. A non-transitory computer-readable recording medium storing a program for causing a computer to function as:
 a counter that performs a counting operation to count, as a count value, an elapsed time required for a motor, which is to rotationally drive a tool element of an electric power tool, to rotate by a predetermined amount;
 a reset device that resets the count value of the counter to an initial value when the motor rotates by the predetermined amount;
 a reference time changing device that changes a reference time, which is used as a determination criterion to determine whether or not a lock state of the motor has occurred, in accordance with an operation input inputted by an operator of the electric power tool to operate a rotation speed of the motor;
 a lock state determination device that determines that the lock state has occurred when the count value of the counter has reached the reference time; and
 an invalidation device that performs, in a case where a false determination of occurrence of the lock state is caused due to the operation input, at least one of a first invalidation operation to invalidate the lock state determination device and a second invalidation operation to invalidate continuation of the counting operation by the counter.

* * * * *